F. P. HARMAN.
NUT LOCK.
APPLICATION FILED NOV. 17, 1909.
981,556. Patented Jan. 10, 1911.
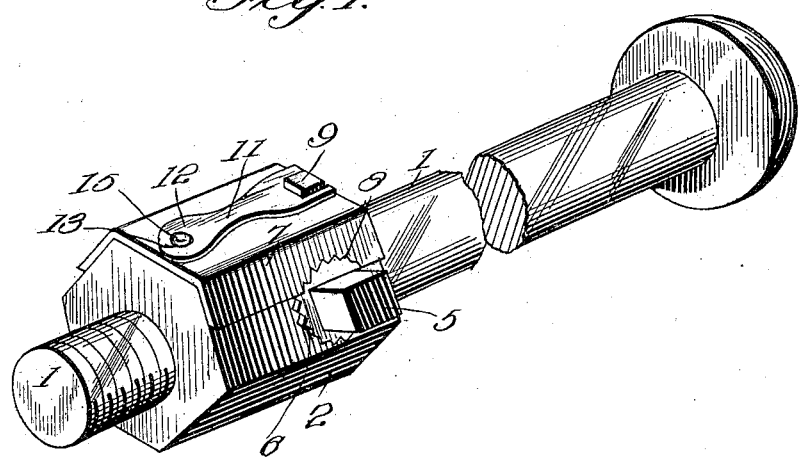
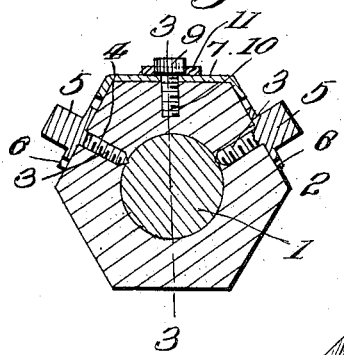
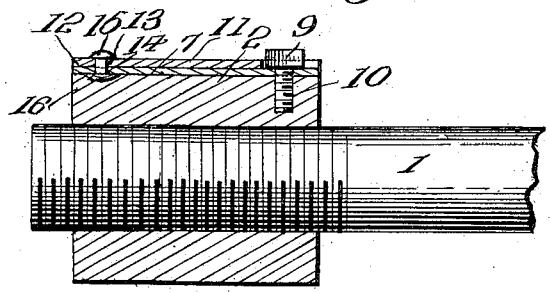
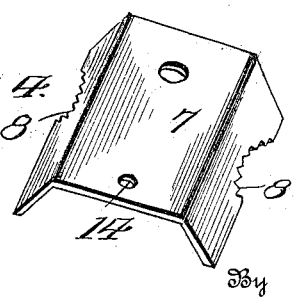
Witnesses
Inventor
F. P. Harman.
By
Attorneys.

UNITED STATES PATENT OFFICE.

FRANK P. HARMAN, OF LANCASTER, OHIO.

NUT-LOCK.

981,556. Specification of Letters Patent. Patented Jan. 10, 1911.

Application filed November 17, 1909. Serial No. 528,504.

*To all whom it may concern:*

Be it known that I, FRANK P. HARMAN, citizen of the United States, residing at Lancaster, in the county of Fairfield and State of Ohio, have invented certain new and useful Improvements in Nut-Locks, of which the following is a specification.

This invention comprehends certain new and useful improvements in nut locks and has for its object to provide a device of this character wherein the nut will be positively locked against displacement through jars, vibration or other causes.

Another object of this invention is to provide a locking means for the bolt engaging devices, thereby holding the same firmly in position such locking means being simple and easily applied and such as may be quickly disengaged when desired.

With this and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawing in which:

Figure 1 is a perspective view of my improved nut lock showing the device applied; Fig. 2 is a transverse sectional view; Fig. 3 is a longitudinal sectional view taken on the line 3—3 of Fig. 2; and, Fig. 4 is a detail perspective of the set screw locking plate.

Corresponding and like parts referred to in the following description are indicated in all the views of the drawing by the same reference characters.

Referring to the drawing, the numeral 1 designates a bolt which is threaded at one end and is adapted to receive the nut 2. The nut 2 is provided in its sides approximately opposite each other, with the threaded apertures 3 which extend therethrough and are designed to receive the set screws 4. The set screws 4 are provided with the heads 5 below which are situated the ratchet teeth 6, which extend entirely around the same, the under side thereof fitting down against the face of the nut when the set screws are in position. Said screws are pointed at their opposite ends for engagement with the bolt.

To hold the set screws 4 in operative engagement with the bolt, the plate 7 is provided. Such plate is bent to conform to the contour of the nut and is provided on opposite sides, about the middle thereof, with the teeth 8 which are designed to mesh with the ratchet teeth 6 on the set screws 4. The screw 9 is provided to secure the plate 7 in position, such screw extending through the said plate and being received in the threaded aperture 10 in the nut 2. To prevent the screw 9 from turning, the locking member 11 is provided. One end of the said member is designed to engage the head of the screw 9, as shown, and has the laterally extending shank 12 near the end of which is provided the aperture 13. The plate 7 is provided with the aperture 14 at this point which registers with the aperture 13 in the shank 12 and said apertures are designed to receive the stud 15, the end of which may be flattened after the plate 11 has been adjusted to place, to securely hold said plate in position.

The stud 15 may be of any desired construction and in this instance, I have shown the same with the head 16, and being inserted in the plate 7 before the same is placed on the nut, is held in position against the same.

The operation of my improved nut lock is as follows: After the nut 2 is in position the set screws 4 are turned into engagement with the bolt. The plate 7 is then applied to lock the set screws 4 into operative position, such plate in turn being held by inserting the screw 9. To finally lock the screw 9 in place, the locking member 11 is applied, one end of said member engaging the head thereof, its opposite end being secured by the stud 15.

From the foregoing description in connection with the accompanying drawing it will be seen that I have provided a structure wherein the nut may be locked to the bolt in such manner as to render its working loose impossible and have provided a simple means whereby such locking means may be held into engagement with the bolt to make the lock doubly secure.

Having thus described the invention, what I claim as new is:

1. A nut lock comprising a bolt, a nut mounted thereon, set screws carried by said nut for engagement with the bolt, a plate adapted to fit on said nut and provided with teeth for engagement with said set screws, a screw carried by the nut for holding the plate in position, a locking member mounted on the plate for engagement with said screw and a stud carried by the plate for engagement with the locking member.

2. A nut lock comprising a bolt, a nut mounted thereon, screws carried by the nut for engagement with the bolt, and a plate secured to the nut, the plate being formed with ratchet teeth and the screws with corresponding teeth, the two sets of teeth interlocking whereby to prevent the screws from turning.

3. A nut lock comprising a bolt, a nut mounted thereon, means carried by said nut for engagement with the bolt, a plate adapted to fit over the nut and provided in its opposite edges with means for engaging the bolt engaging devices, means carried by said nut for securing the plate in position and means for locking said securing means in engagement with the nut.

In testimony whereof I affix my signature in presence of two witnesses.

FRANK P. HARMAN. [L. S.]

Witnesses:
H. C. DRINKLE,
J. H. LITTRELL.